April 5, 1966  A. STUBBMANN  3,244,052
TOY MUSICAL CUCKOO CLOCK
Filed Sept. 30, 1963  3 Sheets-Sheet 1
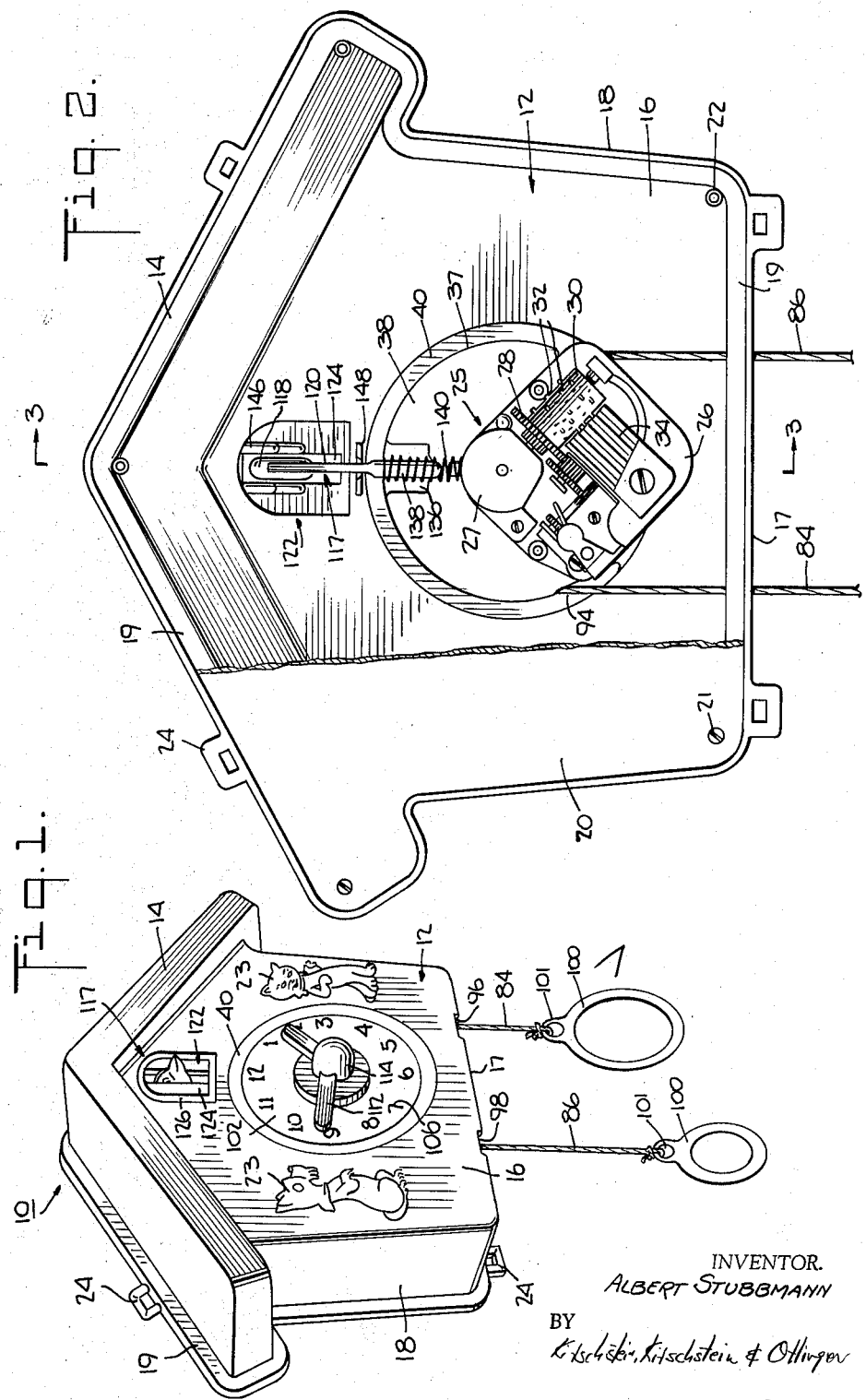
INVENTOR.
ALBERT STUBBMANN
BY
Kitschstein, Kitschstein & Ottinger
ATTORNEYS April 5, 1966     A. STUBBMANN     3,244,052
TOY MUSICAL CUCKOO CLOCK
Filed Sept. 30, 1963     3 Sheets-Sheet 2
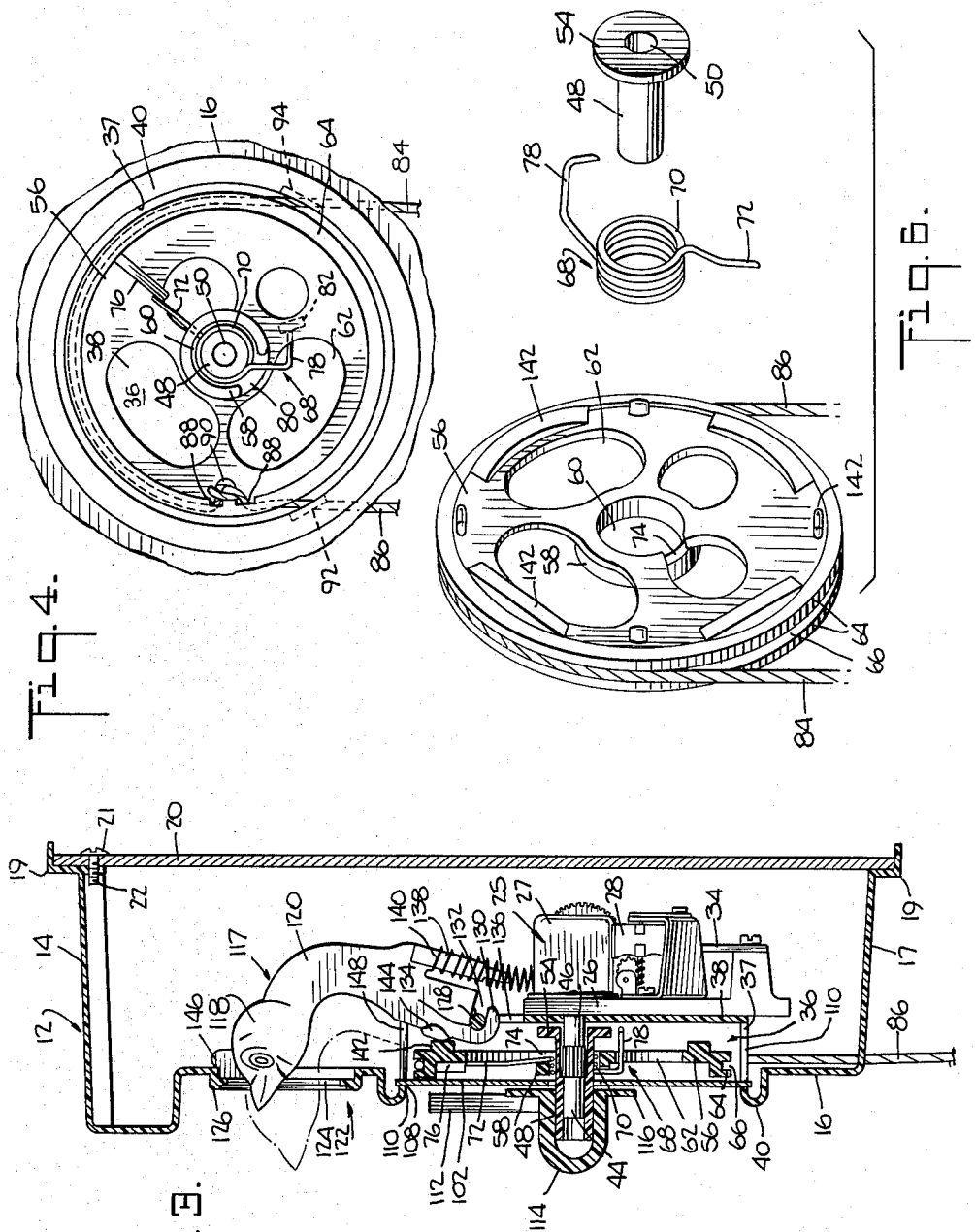
INVENTOR.
ALBERT STUBBMANN
BY
Kirschstein, Kirschstein & Ottinger
ATTORNEY April 5, 1966  A. STUBBMANN  3,244,052
TOY MUSICAL CUCKOO CLOCK
Filed Sept. 30, 1963  3 Sheets-Sheet 3
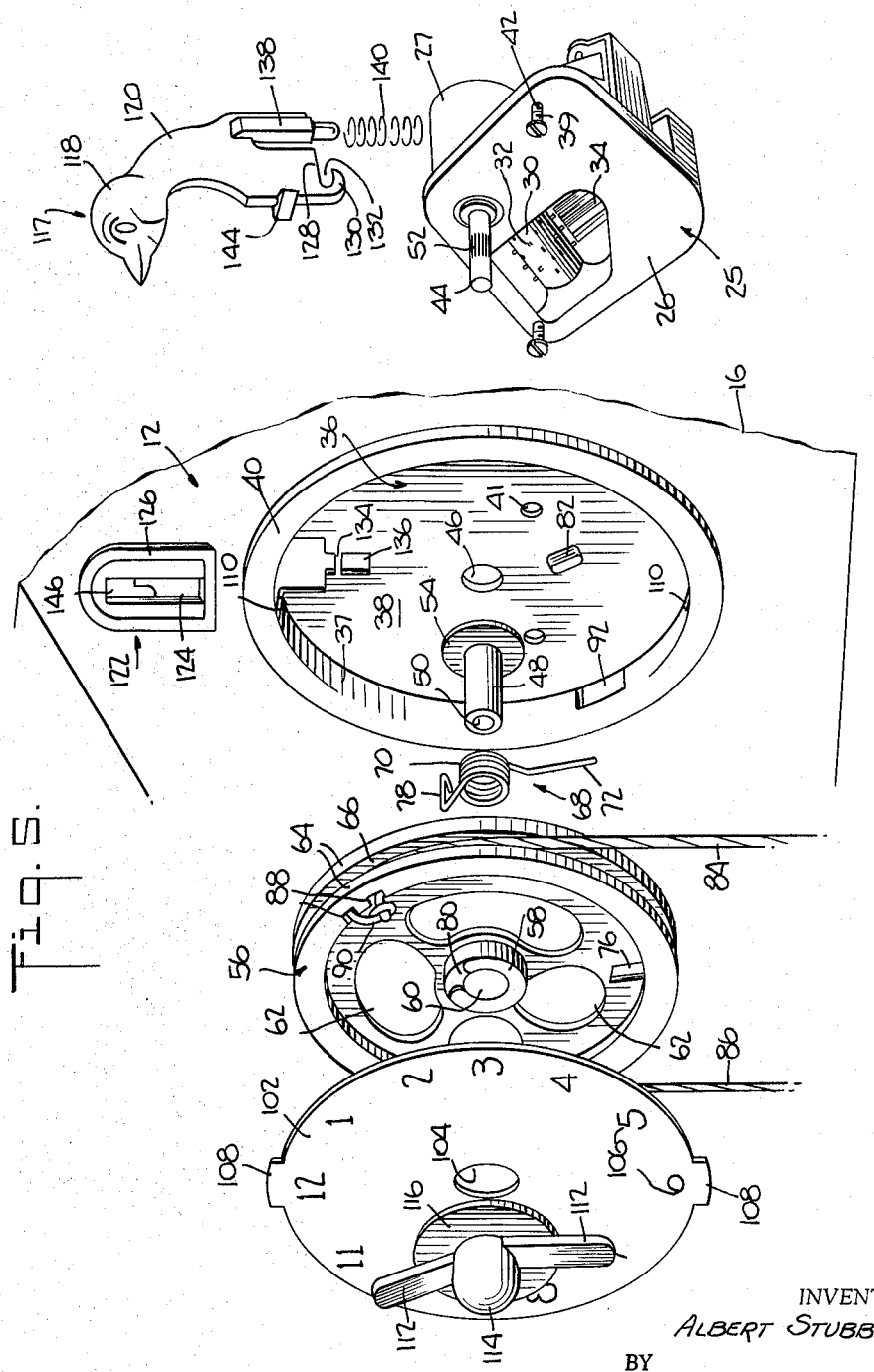
INVENTOR.
ALBERT STUBBMANN
BY
Kirschstein, Kirschstein & Ottinger
ATTORNEY

United States Patent Office 3,244,052
Patented Apr. 5, 1966

---

3,244,052
TOY MUSICAL CUCKOO CLOCK
Albert Stubbmann, Flushing, N.Y., assignor to Kohner Bros., Inc., New York, N.Y., a corporation of New York
Filed Sept. 30, 1963, Ser. No. 312,561
16 Claims. (Cl. 84—94)

This invention relates to a toy musical cuckoo clock and, in particular, to a toy musical cuckoo clock designed and constructed to be practically indestructible in the hands of young children.

It is an object of my invention to provide a toy musical cuckoo clock of the character described which is a colorful and attractive amusement item for children of tender years and which by the attention and winding which the clock demands will help them to train their vision and become acquainted with muscular manipulation of their hands needed to accomplish such tasks and which, in general, by the interest which my cuckoo clock invokes will serve as an entertaining plaything for long periods of play.

It is a further object of my invention to provide a toy musical cuckoo clock of the character described which presents to a child a pseudo clock including a dial bearing both numbers and clock hands and which cooperates with a musical movement within the clock so that a child playing with the clock and properly winding it will be rewarded for his efforts by the rendition of a musical tune.

It is a further object of my invention to provide a toy musical cuckoo clock of the character described which may be wound by two different windup means each requiring and thereby training a child in a particular and different type of hand coordination and movement.

It is yet another object of my invention to provide a toy musical cuckoo clock of the character described which is extremely rugged and durable through prolonged play by a child and whose parts are so constructed and mounted that a child of tender years cannot pull apart, tear or destroy the clock and thereby cannot harm himself or the clock by attempted destructive acts.

It is an additional object of my invention to provide a toy musical cuckoo clock of the character described which will become, in time, a familiar and loved toy of a child by virtue of the musical tunes emanating therefrom, the movement of an attractive figure, e.g. a cuckoo, by the fact that a child can wind the clock in several ways and further by virtue of the pleasant appearance and decorative effect of the clock.

It is yet a further object of my invention to provide a toy musical cuckoo clock of the character described which is composed of comparatively few and simple parts, which is economical in manufacture and fast in assembly and which thereby will provide parents with a low cost highly amusing and educational plaything for their young ones.

These and various other objects and advantages of my invention will become apparent to the reader in the following description.

My invention accordingly consists in the features of construction, combinations of elements and arrangements of parts which will be exemplified in the device hereinafter described and of which the scope of application will be indicated in the appended claims.

In the accompanying drawings in which is shown one of the various possible embodiments of my invention, FIG. 1 is a three-quartered perspective view of a toy musical cuckoo clock made in accordance with my invention;

FIG. 2 is an enlarged back elevational view of the cuckoo clock with its rear wall partially broken away to show its internal mechanism;

FIG. 3 is a side cross-sectional view taken substantially along the line 3—3 of FIG. 2;

FIG. 4 is a front view of the windup pulley and associated components;

FIG. 5 is an exploded frontal perspective view of the dual windup means and musical movement which are incorporated within my invention; and FIG. 6 is an exploded rear view of the windup pulley and unidirectional clutch which are incorporated within my invention.

Referring now in detail to the drawings, the reference numeral 10 denotes a toy musical cuckoo clock constructed in accordance with my invention. The clock 10 includes a one-piece frame which houses and supports the several other components of my invention. In the illustrated embodiment of my invention, a frame 12 is configured in the form of the shell of a cuckoo clock. Said frame includes a gabled roof 14, a front face 16, side walls 18 and a bottom wall 17. The frame is preferably made from any conventional plastic having the characteristics of light weight, resiliency, toughness and durability. Other components of the clock are also formed from a plastic material, as appropriate.

The rear peripheral edge of the frame 12 is outlined by an outwardly protruding flange 19 which is integral with the frame. The flange 19 defines a rearwardly facing shoulder (see FIG. 3) which seats the marginal area of a rear wall 20. The rear wall is joined to the back of the frame as by screws 21 which pass through the wall and thread into spaced tapped aligned apertures 22 in bosses formed in the rear of the side walls 18 and the bottom wall 17. The walls 17, 18 thereby space the rear wall 20 from the front face 16 so as to provide an operating cavity therebetween. The rear wall 20 may be cut from stiff cardboard stock.

The frame 12 is brightly colored or otherwise decorated so as to catch and keep the attention of a young child. The face 16 may carry raised figures 23 in the shape of, say, a dog and a cat. Apertured tabs 24 are provided along the periphery of the rear of the frame 12 on the flange 19 to allow attachment of the clock as by screws, wire or string to any desired suitable vertical surface, e.g. a wall of a child's room or a crib.

A Swiss-type musical movement 25 is mounted on the frame 12 on the back of the front face 16. The movement 25 is of a conventional and well-known type with which those skilled in the art are acquainted. Characteristically, such a movement includes a metal base 26 on which are mounted a spring motor 27, an appropriate reduction gear train 28, a cylindrical drum 30 carrying numerous spaced pins 32 and a musical reed comb 34 located in the path of travel of the pins.

The movement 25 is secured to the rear surface of a cylindrical rearwardly depressed and frontwardly opening well 36 which is formed in the approximate center of the front face 16. The sides of the well are defined by a circular, continuous wall 37 and the bottom of the well is formed by a circular back wall 38. A minor portion of the wall 37 juts forwardly of the front face 16 and forms a circular boss 40 thereon. The axis of symmetry of the well 36 is perpendicular to the plane in which the front face 16 lies. The movement 25 is attached to the back wall 38 of the well 36 as by screws 39 which pass through apertures 41 in the wall and then into tapped bores 42 in the base 26 of the movement 25.

The musical movement 25 has a windup shaft 44 by which energy is stored in the spring motor 27. The shaft 44 winds the spring motor 27 by rotation of the shaft in one direction only, i.e. the energizing direction. This direction is clockwise as shown in FIGS. 1, 4 and 5. When the musical movement operates, i.e. unwinds, it emits a characteristic tinkling musical tune and the shaft 44 is driven by the spring motor in a direction opposite to the energizing direction, i.e. the shaft counter-rotates in a counterclockwise direction as shown in the mentioned figures. The shaft 44 is coaxial with the axis of the well 36 and the movement 25 is located so that said shaft protrudes forwardly through a central aperture 46 in the back wall of the well.

A sleeve 48 having a central through bore 50 is located within the well 36 and is fast on the input or windup shaft 44. The internal diameter of the bore 50 and the external diameter of the shaft 44 are approximately the same and the shaft is in part knurled, i.e. has axially oriented slightly protruding ridges 52 on its exterior which tightly fit into the interior of the sleeve, to aid in the frictional interengagement of these two parts. The sleeve 48 has a circular collar 54 on its end adjacent the back wall 38 of the well 36. Since the sleeve 48 is fixed to the input shaft 44, rotational force applied externally to the sleeve will be transmitted to the shaft and, conversely, rotation of the shaft by the spring motor will rotate the sleeve.

Two different windup means are provided whereby a child may wind the musical movement 25 in two different ways. The first windup means includes a pulley 56 rotatably mounted within the well 36 and coaxial with the input shaft 44. The pulley 56 has a central hub 58 which defines a through aperture 60. Openings 62 in the body of the pulley and spaced from the axis thereof are provided to lighten the pulley for assembly purposes and for mechanical reasons, later to be described. The rim of the pulley 56 includes two spaced peripheral flanges 64 which define therebetween a peripheral groove 66 of semi-circular cross-section.

A unidirectional clutch 68 drivingly connects the pulley 56 to the sleeve 48 and the input shaft 44 for common rotation when the pulley 56 is rotated in one direction, the energizing direction. The clutch 68 disengages, i.e. frees, the pulley from driving interconnection with the sleeve, when the pulley is counter-rotated, i.e. rotated in an idling direction. In FIGS. 1, 4 and 5, when the pulley 56 is rotated in a clockwise direction the unidirectional clutch 68 locks it to the sleeve 48. When the pulley is counter-rotated, i.e. rotated in a counterclockwise direction, the unidirectional clutch frees it from the sleeve 48. To this end the unidirectional clutch comprises a helical torsion spring 70 which has a central multi-turn coiled portion encircling the sleeve 48. In repose, the internal diameter of the coil spring 70 is undersize as compared to the external diameter of the sleeve 48, .002" undersize being suitable. Therefore, in repose, the spring frictionally grips the sleeve. Fixing one end of the spring and twisting the remainder of the spring in one direction will contract the spring and cause it to more firmly constrict against the sleeve, while twisting of the spring in a counter-direction will expand the spring and free it from the sleeve. The spring 70 is made of tempered steel so that it is not readily deformed beyond its elastic limit and so that the spring may provide long and continuous service.

The aperture 60 in the pulley hub 58 is of a slightly larger diameter than the exterior diameter of the spring 70 so that the coil spring may expand about the sleeve without interference by the hub wall in a direction transverse to its axis and so that the pulley is mounted for rotation relative to the spring. The pulley 56 is disposed about the sleeve 48 with its hub 58 encircling the sleeve 48 and coaxial with it. The forward end of the sleeve 48 protrudes through the aperture 60. The central coiled portion of the spring 70 is disposed in the annular space between the hub 58 and the sleeve 48.

The spring 70 has a rear reach 72 which extends radially away from its coiled central portion. The reach 72 passes through a gap 74 on the rear of the hub 58, then through one of the openings 62 in the pulley and is wedged between a side of the opening 62 and a protrusion 76 on the front face of the pulley. The rear end of the spring 70, i.e. the reach 72, is thereby fixed to the pulley 56 at this point so that rotation of the pulley in either direction will likewise rotate the reach 72 of the spring in a similar direction.

The spring 70 has a front reach 78 which also extends radially from the central coiled portion and forms a hook that passes through a notch 80 in the front of the hub 58, then rearwardly freely through an adjacent opening 62 in the pulley and then toward the back wall 38 to the well 36. The tip of this reach runs parallel to the back wall. A protuberance 82 integral with and jutting forwardly from the back wall 38 is located in the lower right hand quadrant of the well and is in the rotational path of travel of the end of the tip of the front reach 78 of the spring 70.

Pull means is provided to oscillate the pulley 56 about its axis of rotation. Said pull means comprises two lengths 84, 86 of cord each of which has an upper end that passes through a different adjacent short hole 88 through the flange 64, running from the groove 66 to the front of the pulley. A knot 90 larger than either hole 88 joins these ends and since the knot cannot pass through either hole, the knot fixes the pull means to the pulley at a point distant from its axis of rotation and on its periphery. The portions of the cords adjacent the knot 90 lie in adjacent different portions of the groove 66. As shown in FIGS. 4 and 5, upper portions of the cord 84 and the cord 86 together occupy that partion of the groove 66 which lies in the upper half of the circumference of the pulley 56. When the pulley 56 rotates in a counterclockwise fashion, a portion of the cord 86 leaves the groove and additional portions of the cord 84 come into contact with the groove. Opposite rotation of the pulley 56 causes the opposite effect on the pull cords.

The portions of the cords 86, 84 not lying in the groove 66 hang tangentially downwardly from the pulley and pass through openings 92, 94, respectively, in the circular well wall 37, each opening being located below, respectively, the leftmost and rightmost segments of the pulley rim. The cords 84, 86 then pass through openings 96, 98, respectively, in the bottom wall of the frame 12, these latter openings being in vertical alignment with the openings 92, 94 in the well wall.

Gayly colored pull rings 100, optionally each of different contour and size, are joined to the ends of the cords by knots which are fastened to openings 101 formed in the rings. Each cord is of sufficient length so that when one cord is pulled downward to the limit of its movement as described hereinafter the ring 100 of the other cord does not reach the bottom wall of the frame 12.

A dial face, a thin flat disc 102, has a central aperture 104 of sufficient diameter to allow it to fit loosely over the forward protruding end of the sleeve 48. The disc 102 carries numerical indicia 106 disposed circumferentially on its exposed face. The numerical indicia range from the numeral 1 through the numeral 12 and represent and are placed similarly to such numerals on a clock face. The outside diameter of the disc 102 is such that it fits snugly within the well 36 with its circumference abutting the circular well wall 37. The disc 102 further has integral radially outwardly protruding tabs 108, one tab being disposed at the uppermost portion of its periphery and the other tab being disposed at the lowermost portion of its periphery. The tabs 108 are snugly received within slots 110 in matching locations in the circular well wall 37. The tabs 108 hold the disc 102 in front of and concealing the pulley 56.

Second windup means is provided to enable the child playing with the cuckoo clock to wind the musical movement 25 in a manner different than the first windup means. The second windup means is configured to resemble the hands of a clock and comprises, to this end, two bars 112 of different length, the longer not exceeding the radius of the disc 102. The bars 112 are fixed relative to and are angularly offset from one another. The bars 112 meet at a rearwardly opening spinner 114 and the bars 112 and the spinner 114 are mounted on an apertured washer 116, which washer is adjacent the disc 102.

The clock hands, i.e. the bars 112, the spinner 114 and the disc 116 are fast upon the sleeve 48, the forward end of the sleeve passing through the washer and then being frictionally engaged within the interior of the spinner 114. By rotating the clock hands in the energizing direction, clockwise as shown in FIGS. 1 and 5, a user winds up the spring motor 27 within the movement 25. When the spring motor unwinds and thereby counter-rotates the sleeve 48, the clock hands will be counter-rotated. Their movement, relative to the dial 102, simulates the movement of a real clock.

A movable observable ornamental figure 117 is mounted on the frame 12 and serves to further enhance the entertaining function of my cuckoo clock. In the instant embodiment, the ornamental observable figure is shaped in the form of a joined head 118 and a neck 120, these being a fanciful imitation of the like parts of a cuckoo. The head 118 and the neck 120 are comparatively thin, that is to say their width is substantially less than either their height or their depth (compare FIGS. 2 and 3). An entranceway 122 for the figure 117 is provided in the face 16 of the frame 12 above the well 36 but below the roof 14, and includes a narrow vertically-elongated slot 124 of sufficient width to allow the head 118 and at least a part of the neck 120 to protrude forwardly therethrough so that they can be viewed by an onlooker. (See FIG. 3.) A forwardly protruding low ridge 126 outlines the entranceway 122 and surrounds the slot 124.

The figure 117 is mounted on the frame 12 for reciprocal rocking movement about a horizontal axis in the plane of the back wall 38 of the well 36. The bottom portion of the figure 117 has a greater depth (front-to-rear dimension) than the neck 120 and includes a flat bottom surface 128 (see FIG. 5) which has a hook-like front extension 130, the extension 130 and the flat bottom surface 128 defining a short horizontal slot 132 open at its rear end.

A horizontal bar 134 runs across a slot 136 in an upper central portion of the back wall 38 of the well 36. The figure 117 when properly mounted is located so that the bar 134 is captured within the closed forward end of the slot 132. The figure is rocked back and forth by cam means soon to be described, the bar 134 serving as the axis of rotation. The slot 136 above and below the bar 134 is cut away so that it does not interfere with the rocking motion of the figure 117 and, to this end, the slot 136 includes a smaller lower portion below the bar and an enlarged portion above the bar. This latter portion connects with the slot 110 in the upper portion of the well wall 37.

Biasing means is provided to urge the head 118 of the figure 117 forwardly and through the entranceway 112. The rear portion of the figure 117 includes a downwardly depending finger 138 spaced on its forward side from the other portions of the figure 117. The bottom of the finger 138 is approximately flush with the bottom of the extension 130. A helical compression spring 140 has its top portion wound around the finger 138 and its bottom end abutting the top of the housing of the spring motor 27. (See FIG. 3.) The spring 140 urges the finger 138 upwardly and thereby urges the head 118 and an adjacent portion of the neck 120 forwardly through the slot 124 in the entranceway 122.

Cam means is provided to selectively urge the figure 117 rearwardly against the force of the spring 140. Said cam means comprises a circumferential series of spaced bosses 142 (see FIG. 6) integral with the rear face of the pulley 56. The bosses 142 are equidistantly radially spaced from the axis of the pulley and are alternately long and short. The figure 117 carries a follower 144 (see FIG. 5) on its forward edge which has a broad face and which is located in the rotational path of travel of the bosses 142. The abutment of a boss 142 against the follower 144 rotates or rocks the figure 117 rearwardly about the bar 134, it being evident that a long boss 142 holds the figure 117 rearwardly for a greater arc of rotation than does a short boss 142. The different lengths of the bosses 142 give a varied and hence more interesting motion to the figure 117. The foremost position of the figure 117 is shown in dot and dash lines in FIG. 3, and the rearmost position is shown in full lines.

Guard means is provided to prevent lateral dislocation of the figure 117. Rearwardly protruding panels 146 are joined each to the upper portion of one of the vertical sides of the slot 124 and prevent unwanted non-axial movement of the head 118 of the figure 117, should the head be pushed rearwardly of the walls of the slot 124. Further, the lower portion of the neck 120 rocks between rearwardly protruding fingers 148 (FIGS. 2 and 3) located immediately below and in back of the entranceway 122.

Turning then to the operation of my cuckoo clock, it will be recalled that dual windup means have been provided to store energy in, i.e. wind, the spring motor 27. The first windup means comprises the pulley 56 and the unidirectional clutch 68. The pulley 56 is oscillated by the pull means, i.e. the cords 84, 86. The pulley 56 is rotated in a clockwise direction, or the energizing direction, by simply pulling the cord 84 downwardly. The pulley will then rotate until that portion of the cord 84 immediately adjacent the knot 90 turns to a position next to the opening 94. When that position is reached no part of the cord 84 will lie in the groove 66 and therefore further downward force on the cord 84 will not rotate the pulley 56. Thus the opening 94 and the cord 84 passing therethrough serve as an angular limit in the clockwise direction for rotation of the pulley 56.

Counter-rotation of the pulley 56 is caused in a similar manner, in this instance the cord 86 being pulled downwardly until that portion of the cord immediately adjacent the knot 90 reaches the opening 92. Since now there is no further portion of the cord 86 to be pulled off of the groove 66 when the described position is reached, no further counter-rotation of the pulley is possible. The opening 92 and the cord 86 passing therethrough serve as a counter-rotational limit for the rotation of the pulley 56.

The clutch 68 drivingly engages the pulley to the sleeve 48 when the pulley is rotated in the energizing or clockwise direction. It will be recalled that the rear reach 72 of the spring 70 is fixed to the pulley and the spring in a position of repose frictionally grips the sleeve 48. The spring is coiled in such a direction that when the reach is turned clockwise its constriction about the sleeve is enhanced. Hence although the forward reach 78 of the spring 70 is free, clockwise rotation of the pulley 56 and consequent clockwise rotation of the spring 70 causes, by the aforesaid frictional engagement, similar rotation of the sleeve 48. The pulley 56 and hence the sleeve 48 may be rotated in this direction until the limit caused by the opening 94 and the cord 84 passing therethrough is reached.

Counter-rotation, i.e. rotation in a non-energizing direction, of the pulley 56 does not exert torque on the sleeve 48. Counter-rotation of the pulley 56 similarly counter-rotates the reach 72 and movement of the spring 70 through said reach in this direction relative to the sleeve 48 tends to unwind or expand the spring so that the spring does not grip the sleeve 48 but rather allows the pulley to slip freely over the sleeve 48. This counter-rotative movement may be continued until the cord 86 and the slot 92 limit further rotation of the pulley.

The rotative and counter-rotative movements of the pulley 56 aforesaid are combined in use of the clock. First one ring and then the other ring 100 may be pulled down thereby imparting an oscillating motion to the pulley 56 between the angular limits fixed by the openings 92, 94. The pulley is rotated from one limit, say clockwise, to its other limit, and then is counter-rotated counterclockwise back to its first limit, and so on. Every rotative portion of this oscillatory motion in a clockwise direction will wind the sleeve 48 and hence the motor 27 and every counter-rotative movement will simply cause the pulley 56 to slip over the sleeve 48 and return the pulley to its counter-rotative limit.

It will be noted at this point that immediately upon the cessation of any winding of the spring motor 27, this motor in turn will rotate the shaft 44 and thus the sleeve 48 in an unwinding direction, i.e. counterclockwise, and simultaneously cause a tune to be played by the musical movement 25. If no oscillatory motion is being imparted to the pulley 56, rotation of the sleeve 48 will cause similar rotation of the pulley 56 since in a position of repose the unidirectional clutch 68 drivingly engages these two components.

When the pulley 56 has been counter-rotated by the shaft sufficiently so that the tip of the forward reach 78 of the coil spring 70 in its rotational path of travel strikes the protuberance 82, such abutment will tend to unwind or expand the spring. This expansion causes disengagement of the pulley 56 from the sleeve 48 allowing the sleeve to further rotate without driving the pulley 56. This disengagement is caused at the same angular position of the pulley as that at which the counter-rotational limit of the pulley would have been reached by oscillation thereof.

The second wind-up means, the clock hands, is fast upon the sleeve 48 so that clockwise rotation of the clock hands by a child will wind up the spring motor 27. When the shaft 44 and hence the sleeve 48 is caused to counter-rotate by the unwinding of the motor 27, the hands will similarly counter-rotate.

Rotation of the pulley 56 in either direction causes the ornamental figure 117 to rock back and forth, i.e. outwardly and inwardly, through the entranceway 122. First one than another of the protruberances 142 on the back of the pulley strikes the follower 144. Abutment thereof causes the figure 117 to rotate about the bar 134, against the force of the spring 140, thereby causing the head 118 to retract backward through the slot 124. When no portion of any protruberance 142 abuts the follower 144 the spring 140 causes the figure 117 to rotate forwardly so that the head 118 and the upper portion of the neck 120 protrude forwardly through the slot 124.

There are several features of my invention inherent in its construction which prevent a child from destroying or taking apart the clock and thereby hurting it or himself. The frame 12 preferably is of a single piece construction so that no access may be had to the interior of the frame from the front. The movement 25 is of a high quality so that a child of tender years cannot readily overwind the motor. The only passageway leading to the interior of the frame is the entrance way 122. The slot 124 is so narrow that a child's finger may not enter therethrough. It will be noted that a child cannot pull the figure 117 forwardly and out through the slot 124 since force applied to the figure in this direction only serves to rock the follower 144 against the pulley 56, either against its rear face or against one of the bosses 142 and the figure rocking about this point has its hook-like protuberance 130 forced against the bar 134. Such motion therefore does not free the figure 117 from its mounting. The panels 146 on the inside surface of the frame and adjacent the upper portion of the slot 124 prevent the figure 117 from being pushed inwardly and sidewardly. The fingers 148 also prevents sidewise movement of the body of the figure. Even a thrust against the figure 117 further back than the frame wall as through the use of a pencil will not disengage it from its mounting.

It may be added that all other components of the cuckoo clock 10 are preferably made from strong, rigid and durable materials which when constructed in accordance with the embodiment of my invention now known to a reader of the instant disclosure will provide a practically indestructible toy musical cuckoo clock. The child may use either of the dual windup means to wind the cuckoo clock. The pull cords 84, 86 and the rings 100 will teach the child one type of muscular hand coordination, and winding the clock by use of the clock hands will teach another kind of motion. The child may observe the moving hands of a clock as well as the intriguing and nonregular motion of the figure 117, all to the end of training his sight and rewarding him for his muscular exertion by action of the toy as well as the rendition of a musical tune from the movement therein.

It thus will be seen that I have provided a device which achieves the several objects of my invention and which is well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention I claim as new and desire to secure by Letters Patent,

1. A musical amusement device comprising a spring driven musical movement having a rotatable windup shaft adapted to store energy in said movement upon rotation of said shaft in one direction only, a frame carrying said movement, and manually operable windup means drivingly engaging said shaft in the energizing direction only, said windup means including an element rotatably mounted on said shaft for oscillatory motion, fixed angular limits between which the element oscillates, a unidirectional clutch locking the element to the shaft for common rotation therewith upon rotation of the element in the energizing direction and freeing the element from the shaft upon counter-rotation of the element and pull means oscillating said element between said limits whereby rotation of the element in the energizing direction toward one limit will energize said musical movement and counter-rotation of the element will return said element to its other limit.

2. A musical amusement device as set forth in claim 1 wherein the uni-directional clutch is a torsion spring wound about the shaft and having one end joined to the element, said spring being contracted and thereby gripping said shaft upon rotation of the element in the energizing direction and expanding and thereby freeing said shaft upon counter-rotation of the element.

3. A musical amusement device as set forth in claim 2 wherein the element is a pulley having a central bore coaxial with and spaced from the windup shaft and through which said shaft passes, said spring being located in the space between the shaft and bore.

4. A musical amusement device as set forth in claim 1 wherein the pull means is a pull cord joined to the element at a point distant from its axis of rotation and adapted to alternatively rotate and counter-rotate the element.

5. A musical amusement device as set forth in claim 1 wherein the element is a pulley having a central bore coaxial with the windup shaft and through which the shaft passes, said pulley having a peripheral groove, and wherein the pull means is a pull cord, said pull cord being fast to the element and having an intermediate section thereof lying in at least a portion of the peripheral groove so that opposed tangential movement of the pull cord will alternately rotate and counter-rotate the wheel.

6. A musical amusement device comprising a spring driven musical movement having a rotatable windup shaft adapted to store energy in said movement upon rotation of said shaft in one direction only, said shaft being driven in an unwinding direction during playing of the movement, a frame carrying said movement, and manually operable windup means drivingly engaging said shaft in the energizing direction only, said windup means including an element oscillatably mounted on said shaft, fixed angular limits between which the element oscillates, a uni-directional clutch locking the element to the shaft for common rotation therewith upon rotation of the element in the energizing direction and freeing the element from the shaft upon counter-rotation of the element, said clutch drivingly engaging the shaft to the element and thereby counter-rotating the element in the unwinding direction as the shaft is driven in a like direction, and pull means oscillating said element between its limits whereby rotation of the element in the energizing direction toward one limit will energize said musical movement and counter-rotation of the element will return said element to its other limit.

7. A musical amusement device as set forth in claim 6 wherein the uni-directional clutch is a torsion spring having a central portion wound about the shaft, said spring having one end fixed to the element and being contracted and thereby gripping the shaft upon rotation of the element in the energizing direction and expanding and thereby freeing said shaft upon counter-rotation of the element, said spring drivingly coupling the shaft to the element for common rotation in the unwinding direction during operation of the movement.

8. A musical amusement device as set forth in claim 7 wherein the other end of the spring is free, and the frame carries a protuberance in the counter-rotational path of travel of said free end, the abutment of said free end and the protuberance expanding the torsion spring and freeing the element from the shaft upon such abutment during counter-rotation in the unwinding direction.

9. A musical amusement device comprising a spring driven musical movement having a rotatable windup shaft adapted to store energy in said movement upon rotation of said shaft in one direction only, a frame carrying said movement, and first and second manually operable windup means each drivingly engaging said windup shaft for rotation in said energizing direction, the first windup means including an element mounted on said shaft for reversible rotation relative to the frame, fixed angular limits between which the element oscillates, a uni-directional clutch locking the element to the shaft for common rotation upon rotation of the element in the energizing direction and freeing the element from the shaft upon counter-rotation of the element, and pull means oscillating said element between its limits whereby rotation of the element in the energizing direction toward one limit will energize said musical movement and counter-rotation of the element will return said element to its other limit, and the second windup means being fast to the windup shaft so that rotation of the second windup means in the energizing direction will rotate the windup shaft in a like direction.

10. A musical amusement device as set forth in claim 9 wherein the frame is the shell of a toy clock, and wherein the second windup means is the hands of the clock.

11. A musical amusement movement as set forth in claim 9 wherein the windup shaft of the musical movement is driven in an unwinding direction during operation of the movement whereby to rotate the clock hands.

12. A musical amusement device comprising a spring driven musical movement having a rotatable windup shaft adapted to store energy in said movement upon rotation of said shaft in one direction only, a frame carrying said movement, and manually operable windup means drivingly engaging said shaft in the energizing direction only, said windup means including an element oscillatably mounted on said shaft, fixed angular limits between which the element oscillates, a uni-directional clutch locking the element to the shaft for common rotation upon rotation of the element in the energizing direction and freeing the element from the shaft upon counter-rotation of the element, pull means oscillating said element between its limits whereby rotation of the element in the energizing direction toward one limit will energize said musical movement and counter-rotation of the element will return said element to its other limit, cam means mounted on said element, and an observable moveable ornament responsive to said cam means.

13. A musical amustment device as set forth in claim 12 wherein the element is a pulley having a central bore coaxial with the input shaft and through which the bore passes, and the cam means is radially spaced protrusions on said pulley.

14. A musical amusement device as set forth in claim 13 within the ornament is pivoted on the frame and has a follower in the path of travel of said protrusions, the rotation of the wheel with its protrusions rocking said figure in one direction and wherein biasing means urges the figure in an opposed direction.

15. A musical amusement device as set forth in claim 11 wherein guard means on the frame prevents accidental dislocation of the ornament, said guard means including panels on the frame parallel to and disposed on each side of the path of travel of the figure.

16. A musical amusement device comprising a spring driven musical movement having a rotatable windup shaft adapted to store energy in said movement upon rotation of said shaft in one direction only, said shaft counter-rotating during play of the movement, a frame carrying said movement, said frame having a front wall behind which the movement is mounted, an opening in said front wall through which the shaft protrudes, a rotary member secured to the protruding portion of the shaft, two vertically registered apertures in the front wall, both apertures being disposed above the opening, a bar carried by the front wall and extending across the lower of said apertures, a thin figure comprising a head on top of a shank, the lower end of the shank having a rearwardly opening hook in which the bar is located, said figure thereby being pivotally mounted on the bar, the head of the figure protruding through the upper aperture, plural cam bosses located in a common annular track and carried by the back of the rotary member, said shank having a forwardly disposed cam follower located to successively engage the cam bosses, and means biasing the shank so that the cam follower is urged forwardly against the rotary member.

References Cited by the Examiner

UNITED STATES PATENTS

| 2,931,135 | 4/1960 | Zalkind | 46—118 |
| 2,939,244 | 6/1960 | Gumes et al. | 46—175 |
| 2,953,869 | 9/1960 | Collischan | 46—118 |
| 3,094,808 | 6/1963 | Medlock | 46—175 |

LOUIS J. CAPOZI, *Primary Examiner.*

R. C. PINKHAM, *Examiner.*

L. J. BOVASSO, *Assistant Examiner.*